March 21, 1933.                R. B. MARTIN                1,902,714
METHOD OF SUPERSHOCK ABSORPTION
Original Filed Jan. 26, 1927     2 Sheets-Sheet 1
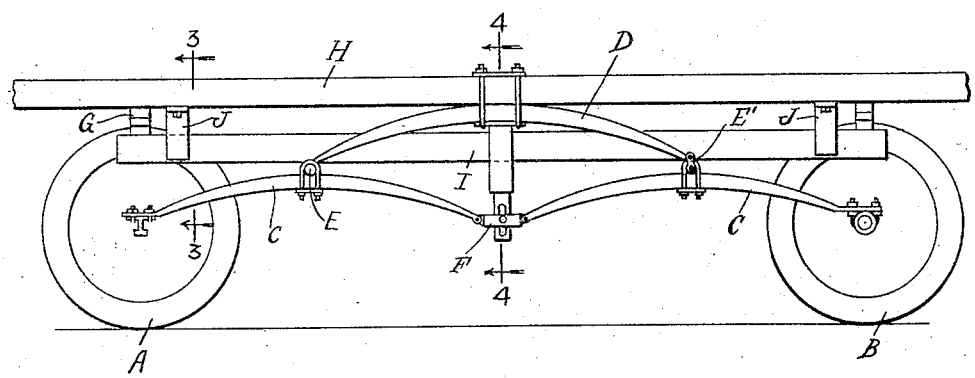
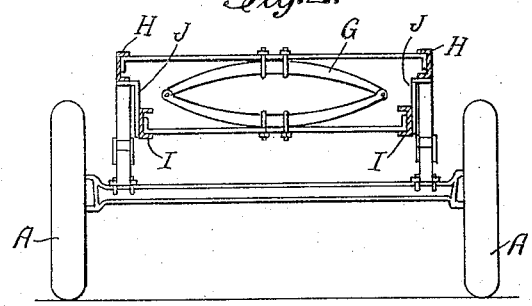 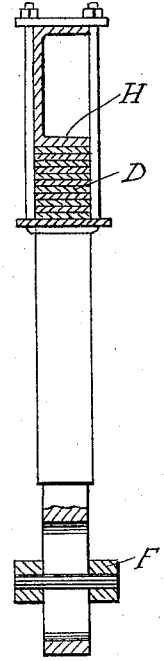
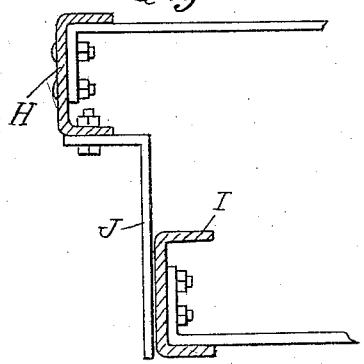
INVENTOR March 21, 1933.  R. B. MARTIN  1,902,714
METHOD OF SUPERSHOCK ABSORPTION
Original Filed Jan. 26, 1927   2 Sheets-Sheet 2
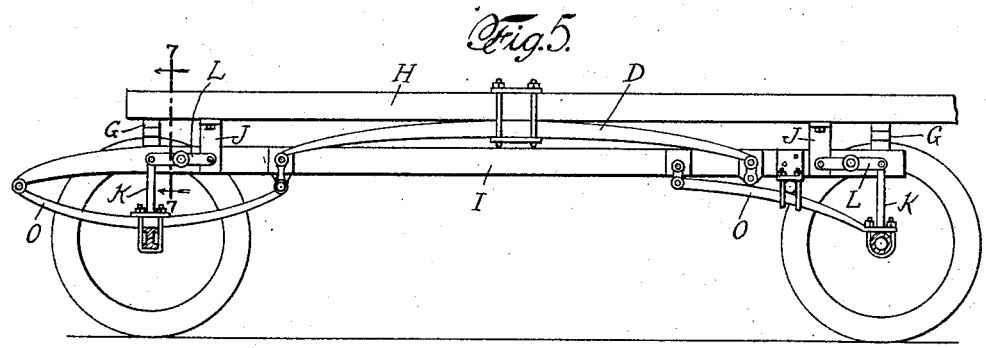
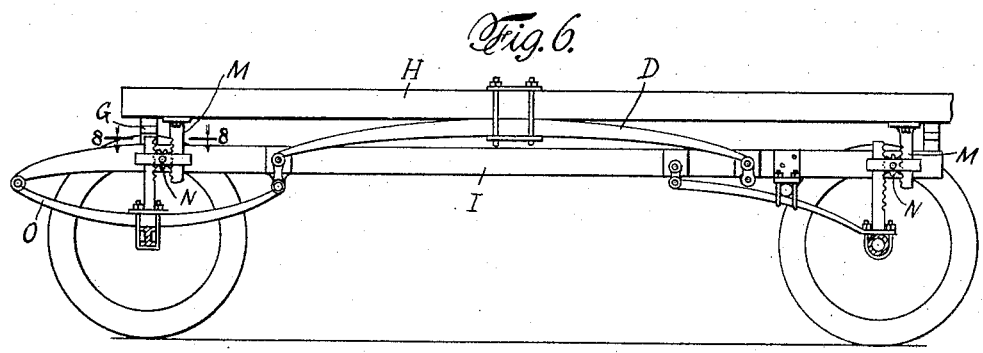
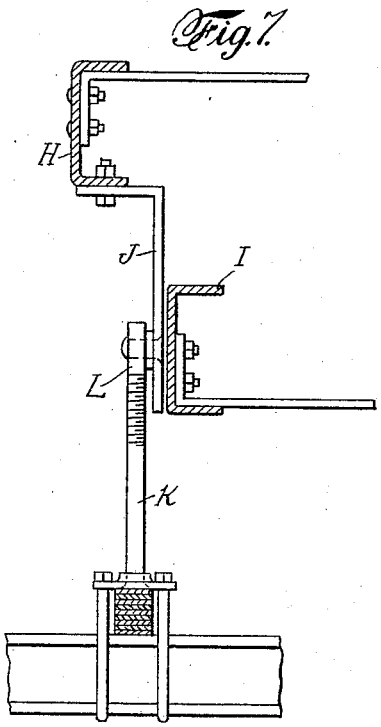
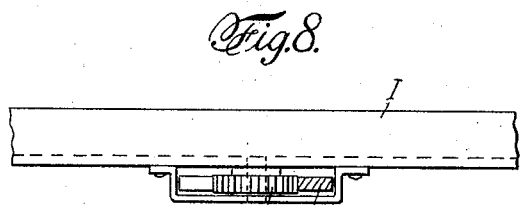
INVENTOR
Rutherford B. Martin Patented Mar. 21, 1933

1,902,714

UNITED STATES PATENT OFFICE

RHETHERFORD B. MARTIN, OF ROSELLE, NEW JERSEY

METHOD OF SUPERSHOCK ABSORPTION

Application filed January 26, 1927, Serial No. 163,709. Renewed March 16, 1932.

This invention relates to a shock absorbing device, appertaining to vehicles, particularly automobile and railway carriages. It is well known that the effect of road shocks sustained by the wheels of vehicles is transmitted to the frame and from it to the passenger carrying system.

The novelty of this invention lies in the principle of mounting the passenger carrying system of the carriage on a floating frame, auxiliary to the chassis or ordinary frame of the carriage, from which connection is made to the wheels through a system of springs, or pneumatic or hydraulic devices, all for the purpose of absorbing first through springs or other devices some proportion of the road shock sustained by the wheels, the balance of the shock being employed, through another system of springs, levers, gears or other devices, to exert on the floating frame sufficient balancing movement to minimize the effect of the shock to the vehicle.

In carrying out the provisions of this invention, I employ in addition to the ordinary frame, a floating frame, supporting the passenger carrying system of the carriage. Connection is made from the floating frame to the chassis frame by springs or other devices installed at the center or other points along its length and at the ends. In addition, connection is made from the floating frame to the wheels, through a system of springs, levers or gears, pivoted from the chassis frame, and adapted to transmit to the floating frame a reverse movement to that of the wheels and the chassis frame induced my road impact. This mechanism produces a compensating movement proportional, in either direction, to the amount of shock applied, and permits the resumption by the floating frame of its normal position in relation to the chassis frame after the effect of the shock has passed.

A more complete understanding of the invention may be had by reference to the accompanying drawings and the following description:

In the accompanying drawings:

Figure 1 is a side elevation of a wheeled vehicle showing the assembly constructed in accordance with the invention.

Figure 2 is an end elevation thereof partly in section.

Figure 3 is a fragmentary vertical sectional view taken on the line 3—3 of Figure 1 looking in the direction of the arrows.

Figure 4 is a fragmentary sectional view on the line 4—4 of Figure 1 looking in the direction of the arrows.

Figure 5 is a side elevation of a modified form of assembly.

Figure 6 is a side elevation of a further modification of assembly.

Figure 7 is an enlarged fragmentary detailed sectional view taken on the line 7—7 of Figure 5.

Figure 8 is a fragmentary sectional view taken on the line 8—8 of Figure 6 looking in the direction of the arrows.

Similar reference characters indicate corresponding parts throughout the several views in the drawings.

Referring now to Figure 1, a shock sustained at front wheel A, of say two inches high, imparts an upward movement to the end of spring C, attached to the axle. This motion is divided at the point E and completely reversed at F, exerting a downward pull on floating frame H, sufficient to compensate for the shock sustained by the chassis frame I. Frame support spring G is for balancing the ends of the floating frame H.

In Figure 5 the downward pull on floating frame H is effected by a simple lever. Plunger K is attached to the axle of each wheel, and upon shock, lever L, pivoted from frame I, exerts through J a downward pull on H. Spring D has the effect of cushioning floating frame H, both from the effect of road shock sustained by chassis frame I, and from undue vibration in the compensating movements induced by K and L.

In Figure 6, lever L is replaced by a cog wheel assembly to produce the same movement, with the exception that it does not allow the adjustment which could be made by changing the position of the pivot in lever L on Figure 5, which would naturally increase or diminish the pull on floating frame H.

Modifications of and adjustments to this type of construction may be made, so as to control the transmission of vibration to the passenger carrying system of the vehicle employing this invention.

It is understood, however, that any one of the many forms of absorbing shock, such as pneumatic or hydraulic devices, may be employed in connection with the floating frame system to accomplish the same result as above. The underlying principle of this invention is made use of in the absorption of shocks by having the passenger carrying system mounted on a floating frame flexibly connected to the chassis or ordinary frame and the wheels.

It is further understood that the present invention is adapted to all types of motor vehicles, carriages or passenger carrying conveyances and that modification may be made from the specific construction above described without departing from the spirit and scope of the invention.

I claim:

1. The combination with front and rear axles of a vehicle, of spaced frames superposed relative to said axles, bowed leaf springs arranged at opposite sides and opposite ends of the frames and connecting the same, said side springs being located medially with respect to the frames, bowed springs yieldably suspending said frames from the axles and means connecting the axles to said frames operative by shock impacts to reverse the directions of movements of the frames and axles.

2. The combination with front and rear axles of a vehicle, of spaced frames superposed relative to said axles, bowed leaf springs arranged at opposite sides and opposite ends of the frames and connecting the same, said end springs being arranged transversely of the frames, said side springs being located medially with respect to the frames, bowed springs yieldably suspending the frames from the axles and means connecting said axles with said frames operative by shock impacts for reversing the directions of movement of the frames and axles.

Signed at New York in the county of New York and State of New York this twenty-fifth day of January A. D. 1927.

RHETHERFORD B. MARTIN.